Figure 1:
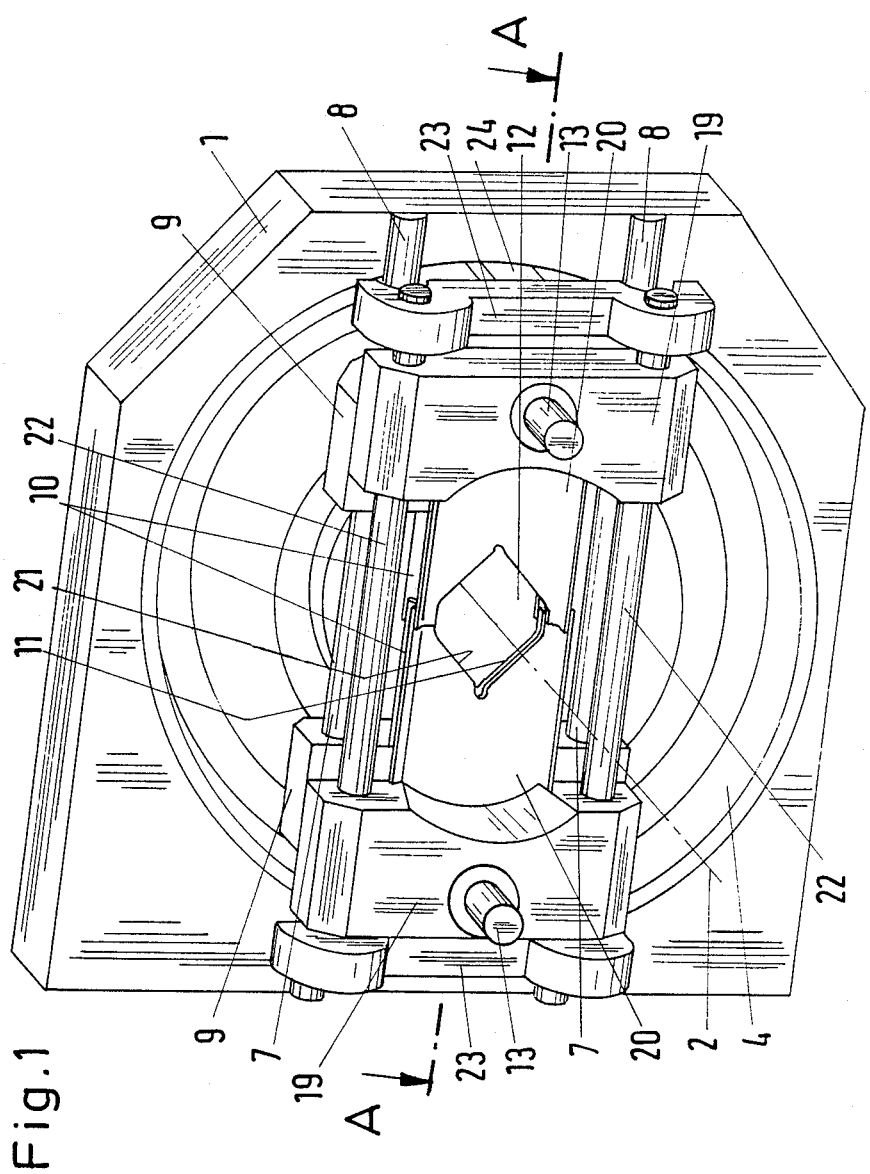

United States Patent [19]

Niedecker

[11] Patent Number: 4,750,239
[45] Date of Patent: Jun. 14, 1988

[54] APPARATUS FOR PARTING OFF PORTION PACKAGES FROM FLEXIBLE TUBING WHICH CONTAINS A DIVIDABLE FILLING MATERIAL

[76] Inventor: Herbert Niedecker, Am Ellerhang 6, D 6240 Königstein, Fed. Rep. of Germany

[21] Appl. No.: 27,704

[22] Filed: Mar. 19, 1987

[30] Foreign Application Priority Data

Mar. 25, 1986 [DE] Fed. Rep. of Germany ....... 3610010

[51] Int. Cl.[4] ............................................. A22C 11/00
[52] U.S. Cl. ......................................... 17/34; 17/1 F; 53/138 A; 53/550
[58] Field of Search ........................ 17/1 F, 33, 34, 49; 53/550, 551, 552, 138 A, 138 R, 393; 493/202

[56] References Cited

U.S. PATENT DOCUMENTS

| | | | |
|---|---|---|---|
| 2,113,658 | 4/1938 | Lakso | 493/202 X |
| 3,320,720 | 5/1967 | Murray | 53/551 |
| 3,328,835 | 7/1967 | Gartrell | 17/34 |
| 4,218,861 | 8/1980 | Marz | 53/550 X |
| 4,438,545 | 3/1984 | Kupcikevicius et al. | 17/34 X |
| 4,463,477 | 8/1984 | Ziolko | 17/34 |
| 4,622,718 | 11/1986 | Glanz et al. | 17/49 |

FOREIGN PATENT DOCUMENTS 0516391 6/1977 U.S.S.R. ................................. 17/1 F

Primary Examiner—Robert L. Spruill
Assistant Examiner—Steven P. Weihrouch
Attorney, Agent, or Firm—Sprung Horn Kramer & Woods

[57] ABSTRACT

A parting-off apparatus used, e.g., to part off individual sausages from a tubing, which is continuously filled with sausage meat, comprises displacing members (9, 10; 19, 20), which can be rectilinearly moved in mutually opposite directions and have triangular cutouts (11; 21), which constrict the tubing so as to form a constricted portion therein and in that region displace the filling material in the tubing. The displacing members (9, 10; 19, 20) are periodically driven by means of a control disc (4), which is periodically driven to rotate in one sense and which has the configuration of a circular ring and has an axis of rotation (2) which coincides with the axis of the tubing and of the opening (12) defined by the displacing members. The rotation of the control disc (4) is transmitted to the displacing members (9, 10; 19, 20) by means of rollers (15; 26), which are mounted on the displacing members (9, 10; 19, 20), and which scan an endless peripheral cam track (16; 27), which is provided on the control disc (4).

6 Claims, 4 Drawing Sheets

APPARATUS FOR PARTING OFF PORTION PACKAGES FROM FLEXIBLE TUBING WHICH CONTAINS A DIVIDABLE FILLING MATERIAL

DESCRIPTION

This invention relates to apparatus for parting off portion packages from flexible tubing which contains a dividable filling material, wherein the filled tubing is constricted and at least one seal is applied to the empty tubing portion which has been formed by an axial displacement of the filling material, comprising overlapping displacing members, which are symmetrical with respect to the axis of the tubing and are displaceable in mutually opposite directions and have substantially triangular cutouts, which face each other, and a periodically driven control disc, which is rotatable about its axis and during such rotation operates transmitting elements for operating the displacing members in a cycle of operations which consists of a closing stroke and an opening stroke.

A large number of such parting-off apparatuses are known for use with closing apparatus and serve mainly to part off individual sausages from a sausage string. Such apparatuses have been disclosed, e.g., in German Patent Publication No. 10 27 548, German Patent Specification No. 15 86 210 and Published German Application No. 25 50 042. Such apparatuses always follow a filling machine in the working direction. In such filling machine, the filling material is forced, e.g., into a tubular wrapper, which is withdrawn from the outside of the filling tube. For the parting-off operation, the filling operation is discontinued and the parting-off and closing apparatus are operated. When their cycle of operations has been completed, the filling operation is resumed.

In the apparatus known from German Patent Specification No. 15 86 210 the displacing members consist of pivoted scissor members, which have constricting cutouts that are moved along arcs of a circle to the filling tubing. The rotation of the control disc is transmitted by toggle joints, rams and rockers to the scissor members.

In the known apparatus which has been described hereinabove the displacing members are guided to perform rectilinear movements (as is illustrated, e.g., in German Patent Publication No. 10 27 548 and German Patent Specification No. 22 47 515). In those cases the movement of the control disc is transmitted to the displacing members by a slider, which is provided with cam faces.

A disadvantage which is common to all said known dividing apparatuses resides in that the drive means for controlling the displacing members constitute an expensive structure and during operation require an acceleration and retardation of the transmitting members having relatively large masses. The latter fact will be particularly disturbing if the transmitting members (also) perform a reciprocating motion. For this reason it is an object of the invention distinctly to reduce the structural expenditure involved in the means for driving and controlling the displacing members as well as the masses to be moved during their cycle of operations.

In accordance with the invention that object is accomplished in that the control disc has the configuration of a circular ring and is so arranged that its axis of rotation coincides with the axis of the tubing, and the transmitting members consist of cam followers which are secured to the displacing members and directly scan an endless peripheral cam track provided on the rotating control disc. As a result, the control disc is concentric or coaxial to the constricting portions of the displacing members and virtually surrounds the latter, and the mass of the cam followers mounted on the displacing members may be very small. The cam followers suitably consist of rollers which are movably mounted on the displacing members and positively engage the cam track which is formed on the control disc. Alternatively the cam followers may consist of sliders.

In the operation of the parting-off apparatus only the displacing members and the cam followers are required to be reversed, i.e., to be accelerated and retarded in alternation, because the provision of the continuously revolving cam tracks on the control disc permits the latter to be rotated only in one sense. This is the essential difference between the invention and the control system which is known from U.S. Pat. No. 2,113,658 for use in a machine for making tubular bags, for filling portions into said bags and for welding said bags.

The invention will preferably be applied to a parting-off apparatus which in known manner comprises two pairs of displacing members which are movable in mutually opposite directions and which in a closed position can be axially moved apart so that a longer empty portion which is free of filling material can be formed in the tubing and it is possible to apply two spaced apart seals to said empty portion (Published German Application No. 25 50 042). The chain of interconnected portion packages can be divided into shorter chains or into single packages in that an empty portion is severed between two seals. In such an apparatus it is contemplated in accordance with the invention that the displacing members of the pair which can be axially moved apart from the other pair are provided with cam followers, which directly scan another cam track that is provided on the control disc. The action of the above-mentioned first cam track for controlling the closing and opening movements of the displacing member depends on the change of the radius of cam track portions. The action of the second cam track mentioned above will depend on cam track portions which rise and descent relative to the main plane of the control disc (parallel to the axis of the tubing and of the control disc) and which impart an axial movement to the displacing members of the axially movable pair. The control disc having the configuration of a circular ring and the pairs of displacing members may be so arranged that the cam followers cooperating with the second cam track may also consist of simple rollers.

In the parting-off apparatus comprising pairs of displacing members which can be moved apart it is known in conjunction with displacing members for performing rectilinear closing and opening movements to provide two parallel guide rods on which the displacing members of one pair are axially displaceable relative to those of the other pair. In such an embodiment of the apparatus it is contemplated within the scope of the invention that the axes of the two guide rods and the axis of the tubing and of the control disc lie in one plane so that no torque will arise as would be the case if the axial force exerted adjacent to the guide rods were offset from the reaction force which is exerted along the axis of the tubing during the axial displacement.

The structure and the mode of operation of the novel parting-off apparatus can be further simplified in that the cam follower rollers for controlling the closing and opening strokes of the displacing members are movably mounted on the guide rods which connect the displacing members. In that case the roller may consist of eccentric rollers and the stroke of the displacing members can be changed by a rotation of the guide rods about their longitudinal axes. Such a change or, more exactly, such a shifting of the stroke position, will be required if the diameter of the constricting opening in the closed position of the displacing members must be selected in adaptation to the wall thickness of the tubing and to the thickness of the empty tubing portion being formed.

Figure 2:
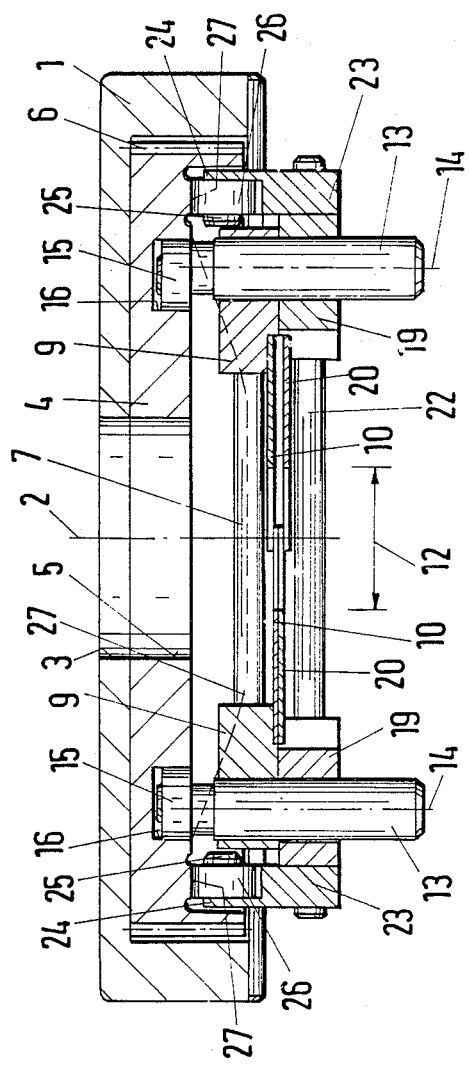
Figure 3:
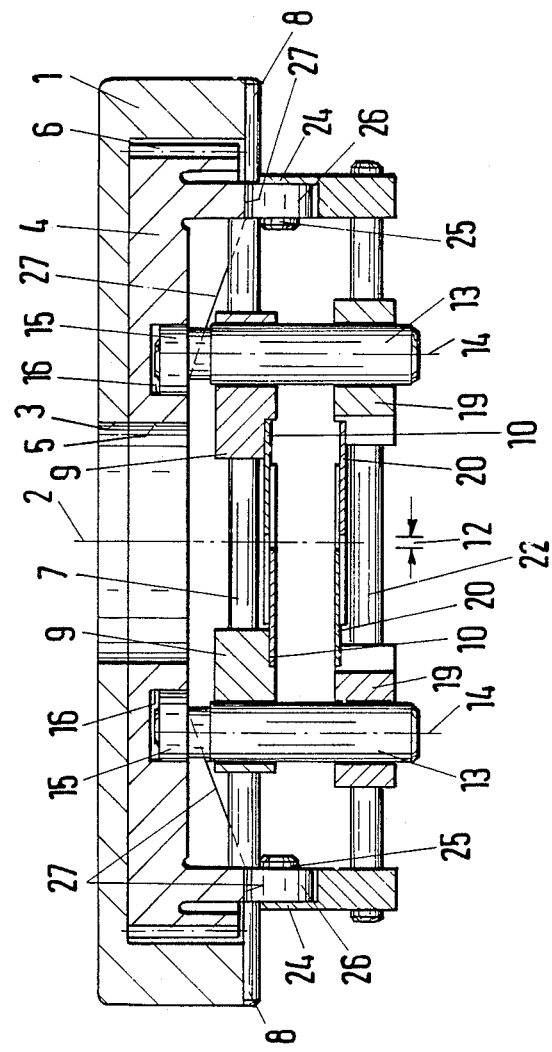
Figure 4:
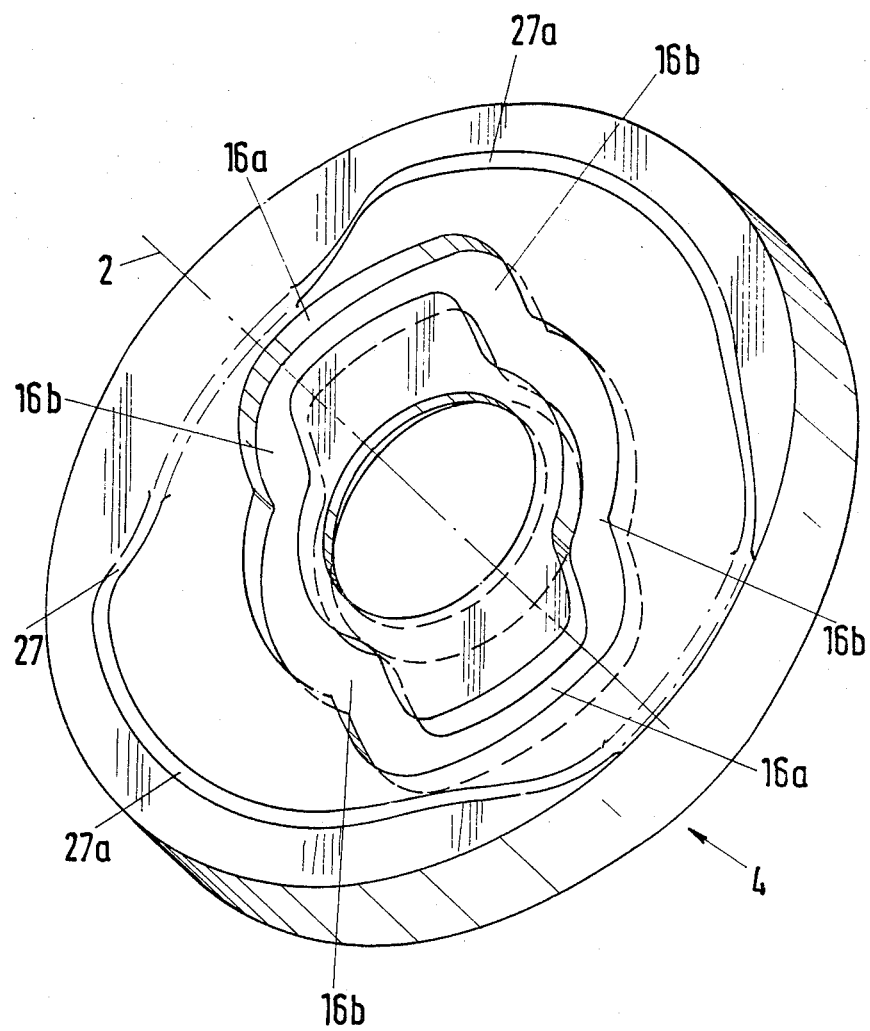

An illustrative embodiment of the invention is illustrated in the drawings, in which FIG. 1 is a perspective view showing the parting-off apparatus, FIG. 2 is a sectional view taken on line A—A in FIG. 1 and shows the apparatus when it is in a position of rest, e.g., during a filling operation;

FIG. 3 is a sectional view which is also taken on line A—A in FIG. 1 but shows the apparatus with the displacing members in a closed (constricting) position after they have been axially moved apart; and FIG. 4 is a perspective view showing the control disc provided with the cam tracks.

A control disc 4 is enclosed by and movably mounted in a housing 1, which has an opening 3 that is concentric to a center line 2. The control disc 4 has a central opening 5 that is aligned with the coaxial opening 3 of the housing 1. The control disc 4 is provided at its periphery with gear teeth 6 in mesh with drive means which are not shown and consist of a pinion, a cogged vee belt or the like. The means for mounting the housing 1 are not shown too and serve to align the housing and the entire parting-off apparatus in operation relative to a filling apparatus in such a manner that the center line 2 is coaxial to the axis of the filling tube of the filling machine. The tubing is supplied with filling material through the filling tube and is then pulled from the filling tube.

A pair of guide rods 7 are respectively disposed above and below the axis 2 and extend in a horizontal direction transversely to the openings 3, 5. Said guide rods 7 have halved end portions 8, which are secured to the housing 1. The guide rods 7 virtually constitute the backbone of the entire displacing mechanism to be described hereinafter and define also a reference plane for said mechanism.

The jaws 9 of a first pair of displacing members are mounted on the rods 7 and are guided on said rods for a rectilinear displacement. The displacing members of said first pair are close to the housing. The displacing plates 10 associated with the jaws 9 are secured to the latter so as to face and overlap each other so that the substantially triangular cutouts 11 circumscribe a closed opening, which is radially symmetrical with respect to the axis 2. The displacing members consisting of the jaws 9 and the displacing plates 10 can be displaced on the guide rods 7 in mutually opposite directions to change the size of the opening 12 from the largest width shown in FIGS. 1 and 2 to the smallest width apparent from FIG. 3.

Said displacement is controlled by a pair of guide rods 13, which extend between the guide rods 7 at right angles thereto and through the jaws 9. The axes 14 of the rods 13 lie in one plane with the axis 2. Eccentric rollers 15 are rotatably mounted on those ends of the guide rods 13 which are nearer to the housing. Said eccentric rollers 15 engage and scan cam tracks 16 formed on the control disc 4. Because the radial distance from the cam tracks 16 to the center line 2 varies around the periphery of the cam tracks 16 (see FIG. 4), the control disc 4 during each revolution imparts to the guide rods 13 a reciprocating motion in mutually opposite directions and said motion will be transmitted to the displacing members 9, 10. By that motion the size of the opening 12 circumscribed by the cutouts 11 of the displacing plates 10 is decreased to a minimum and is subsequently increased to a maximum.

To the extent permitted by the eccentricity of the rollers 15, said maximum and minimum dimensions of the opening 12 can be changed in that the guide rods 13 are rotated about their axes 14.

The displacing members of a second pair are also mounted on the guide rods 13 and are guided so that they can be moved apart from the displacing members of the first pair, which consist of the jaws 9 and the displacing plates 10.

The displacing members of said second pair consist of jaws 19 and of displacing plates 20, which also overlap each other and have cutouts 21, which are aligned with the triangular cutouts 11 of the displacing plates 10. Two parallel guide rods 22 extend transversely to the guide rods 13 and parallel to each other and to the guide rods 7 associated with the displacing members 9, 10 of the second pair and extend through the jaws 19 and, as a result, extend also horizontally above and below the center line 2. The guide rods 22 are interconnected at their ends by cross-pieces 23 so that a rectangular frame is obtained. Centrally between the guide rods 22 the crosspieces 23 are provided with pivot carriers 24, which extend toward the housing 1 and toward the control disc 4 in a direction which is parallel to the guide rods 13. Cam follower rollers 26 are movably mounted on pins 25, which are secured to the pivot carriers 24. The cam follower rollers 26 roll on a circular cam track 27, which is centered on the center line 2 and disposed outside the cam track 16 on that side of the control disc 4 that is remote from the housing. The cam track 27 comprises axially protruding track 27 (see FIG. 4).

Two end positions of the displacing mechanism are shown in FIGS. 2 and 3, respectively. The mechanism is moved from one of said positions to the other by a rotation of the control line disc 4 through 90°. In the position of rest or initial position shown in FIG. 2, the displacing members 9, 10 and 19, 20 of the two pairs are not spaced apart but contact each other and the displacing members of each pair are diametrically spaced apart so that the opening 12 around the center line 2 has the maximum size. At that time the rollers 15 contact those portions 16a of the cam track 16 which have the largest radial distance from the axis 2 (FIG. 4). When the control disc 4 is now rotated, the cam follower rollers 15 first contact the cam track 16 at portions 16b thereof, which extend in a direction that has a radially inwardly directed component so that the rods 13 are moved toward each other and carry the jaws 9, 19 of all displacing members along. As a result, the opening 12 defined by the cut-outs 11, 21 is decreased in size, a tubing portion extending through the opening 12 is constricted and the filling material in said portion will be displaced.

As the rotation of the control disc 4 is continued, the cam follower rollers 26 contact the axially protruding portions 27a of the cam track 27 (FIG. 4) so that the pair of displacing members consisting of the jaws 19 and the displacing plates 20 are axially displaced on the guide rods 13 and are thus moved apart from the jaws 9 and the displacing members 10 which constitute the displacing members of the other pair. At that time, an empty tubing portion extends between the pairs of displacing members and one or two seals can be applied to said empty tubing portion in conventional manner. The resulting position (without the empty tubing portion) is illustrated in FIG. 3, in which it can be seen that the opening 12 now has its smallest size. After a continued rotation of the control disc 4 through further 90° the displacing mechanism has reached its initial position (FIG. 2) and the cycle of operations has been completed.

The return movement of the second pair of displacing members consisting of the jaws 19 and the displacing plates 20 to the initial position shown in FIG. 2 is not enforced by cooperation of the cam track 27 with the cam follower rollers 26 but can be ensured by suitable means consisting, e.g., of pneumatic cylinders, which may be connected to the free ends of the guide rods 13 and become effective when the cam follower rollers 26 reach the 'lower' portions of the cam track 27 during the last quarter of the revolution of the control disc 4.

FIG. 4 illustrates the design of the cam tracks 16 and 27 on the control disc 4. The cam track 16 virtually extends in the main plane of the control disc 4 and comprises portions, e.g., 16a and 16b, which are spaced different distances from the axis 2. The annular cam track 27 extends about the axis 2 at a uniform distance from the latter and has portions 27a which axially protrude from other portions and are thus offset from the main plane mentioned above.

It will be understood that the specification and examples are illustrative but not limitative of the present invention and that other embodiments within the spirit and scope of the invention will suggest themselves to those skilled in the art.

What is claimed is:

1. In an apparatus for forming linked packages from a flexible tubing which contains a dividable filling material, comprising means for constricting the filled tubing thereby axially to displace filling material and form an empty portion, and means for applying a seal to the empty portion, the constricting means comprising overlapping displacing elements which are symmetrical with respect to the axis of the tubing and are displaceable in mutually opposite directions and have substantially triangular cutouts which face each other, and a periodically driven control disc which is rotatable about its axis and during such rotation operates transmitting elements for operating the displacing elements in a cycle of operations which consists of a closing stroke and an opening stroke, the improvement wherein (a) the displacing elements comprise two pairs of members which are movable in mutually opposite directions and which in a closed position can be axially moved apart, the displacing members (19, 30) of the pair which can be axially moved away from the other pair being provided with cam followers (26) which directly scan a second endless peripheral cam track (27) that is provided on the control disc (4), (b) the control disc (4) has the configuration of a circular ring and is so arranged that its axis of rotation (2) is coaxial with the axis of the tubing, and (c) the transmitting elements comprise cam followers (15) which are secured to the displacing elements (9, 10) and directly scan a first endless peripheral cam track (16) provided on the rotating control disc (4).

2. An apparatus according to claim 1, wherein the first cam track (16) which serves to displace the displacing members (9, 10) has a changing radial distance from the axis of rotation (2) of the control disc (4) and the second cam track (27) for moving the pairs of displacing members apart has a changing distance in the direction of the axis from the main plane of the control disc (4).

3. An apparatus according to claim 1, wherein the cam followers comprise rollers (15, 26) which are movably mounted on the displacing members and roll on the cam tracks (16, 27).

4. An apparatus according to claim 1, including two parallel guide rods on which the displacing members of one pair can be axially moved away from the displacing members of the other pair, the axes (14) of the two guide rods (13) and the axis (2) of the tubing and of the control disc lying in a common plane.

5. An apparatus according to claim 4, wherein the cam follower (15) which control the closing and opening strokes of the displacing members (9, 10; 19, 20) comprise rollers (15) which are movably mounted on the guide rods (13) which connect the pairs of displacing members.

6. An apparatus according to claim 5, wherein the rollers (15) comprise eccentric rollers, the guide rods (13) being rotatable about their longitudinal axes (14), such rotation effecting a change of the stroke of the displacing members (9, 10; 19, 20).

* * * * *

UNITED STATES PATENT AND TRADEMARK OFFICE
CERTIFICATE OF CORRECTION

PATENT NO. : 4,750,239

DATED : June 14, 1988

INVENTOR(S) : Herbert Niedecker

It is certified that error appears in the above-identified patent and that said Letters Patent is hereby corrected as shown below:

Col. 2, lines 43-44          After "rise and" delete "descent" and substitute --decend--

Col. 6, line 10          After "displacing members" delete "30" and substitute --20--

Signed and Sealed this

Twenty-seventh Day of December, 1988

Attest:

DONALD J. QUIGG

*Attesting Officer*          *Commissioner of Patents and Trademarks*